US012518197B2

(12) United States Patent
Harary et al.

(10) Patent No.: US 12,518,197 B2
(45) Date of Patent: Jan. 6, 2026

(54) INCREMENTAL LEARNING WITHOUT FORGETTING FOR CLASSIFICATION AND DETECTION MODELS

(71) Applicant: International Business Machines Corporation, Armonk, NY (US)

(72) Inventors: Sivan Harary, Manof (IL); Leonid Karlinsky, Mazkeret Batya (IL); Joseph Shtok, Binyamina (IL)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 17/135,014

(22) Filed: Dec. 28, 2020

(65) Prior Publication Data

US 2022/0207410 A1    Jun. 30, 2022

(51) Int. Cl.
*G06N 20/00* (2019.01)
*G06N 3/082* (2023.01)
*G06N 5/04* (2023.01)

(52) U.S. Cl.
CPC ............. *G06N 20/00* (2019.01); *G06N 3/082* (2013.01); *G06N 5/04* (2013.01)

(58) Field of Classification Search
CPC .......... G06N 20/00; G06N 3/082; G06N 5/04; G06N 3/0464; G06N 3/045; G06N 3/09
See application file for complete search history.

(56) References Cited

U.S. PATENT DOCUMENTS

| 10,162,794 B1* | 12/2018 | Arel ........................ G06N 3/084 |
| 2020/0042904 A1* | 2/2020 | Qi ............................ G06N 20/20 |
| 2020/0074305 A1* | 3/2020 | Cao ......................... G06N 3/048 |
| 2020/0175362 A1 | 6/2020 | Zhang et al. |

(Continued)

OTHER PUBLICATIONS

Schwartz, Eli et al;. "RepMet: Representative-Based Metric Learning for Classification and Few-Shot Object Detection." 2019 IEEE/CVF Conference on Comp (Year: 2019).*

(Continued)

*Primary Examiner* — Omar F Fernandez Rivas
*Assistant Examiner* — Corey M Sackalosky
(74) *Attorney, Agent, or Firm* — Shackelford, McKinley & Norton, LLP

(57) ABSTRACT

A computing system, computer program product, and computer-implemented method for incremental learning without forgetting for a classification/detection model are provided. The method includes receiving, at a computing system, a classification/detection model including a base embedding space and corresponding base embedding vectors that are based on a base training dataset including base classes. The method also includes expanding the classification/detection model to account for a new training dataset including new classes by lifting the base embedding space to add an orthogonal subspace for the new classes, producing an expanded embedding space and corresponding expanded embedding vectors that are of a higher dimension than the base embedding vectors. In some embodiments, the method also includes further expanding the expanded classification/detection model to account for another new training dataset including additional new classes by lifting the expanded embedding space to add another orthogonal subspace for the additional new classes.

15 Claims, 9 Drawing Sheets

(56) References Cited

U.S. PATENT DOCUMENTS

2020/0175384 A1* 6/2020 Zhang .................... G06N 3/088
2020/0302230 A1* 9/2020 Chang ................... G06F 18/214

OTHER PUBLICATIONS

Ulyanov, Dmitry, et al. "Deep Image Prior." International Journal of Computer Vision, vol. 128, No. 7, Mar. 2020, pp. 1867-1888. Crossref, https://doi.org/10.1007/s11263-020-01303-4. (Year: 2020).*

Zhang, Junting, et al. "Class-Incremental Learning via Deep Model Consolidation." 2020 IEEE Winter Conference on Applications of Computer Vision (WACV), IEEE, 2020, pp. 1120-1129. Crossref, https://doi.org/10.1109/wacv45572.2020.9093365. (Year: 2020).*

Zhang, J., Zhang, J., Ghosh, S., Li, D., Tasci, S., Heck, L., Zhang, H., & Kuo, C.J. (2019). Class-incremental Learning via Deep Model Consolidation. 2020 IEEE Winter Conference on Applications of Computer Vision (WACV), 1120-1129 (Year: 2019).*

Maltoni, Davide, et al. "Continuous learning in single-incremental-task scenarios", Neural Networks, vol. 116, Aug. 2019, pp. 56-73. Abstract.

Parisi, German I., et al., "Continual lifelong learning with neural networks: A review", Neural Networks vol. 113, Feb. 6, 2019, pp. 54-71.

Shmelkov, Konstantin, et al., "Incremental Learning of Object Detectors without Catastrophic Forgetting Konstantin", Proceedings of the IEEE International Conference on Computer Vision (ICCV), 2017, pp. 3400-3409.

Zhang, Junting, et al., "Class-incremental Learning via Deep Model Consolidation", University of Southern California, Jan. 16, 2020, 15 pages.

Zhao, Hanbin, et al., "Few-Shot Class-Incremental Learning via Feature Space Composition", Zhejiang University, Jun. 28, 2020, 13 pages.

* cited by examiner

INCREMENTAL LEARNING WITHOUT FORGETTING FOR CLASSIFICATION AND DETECTION MODELS

BACKGROUND

The present disclosure relates to the field of machine learning. More specifically, the present disclosure relates to incremental learning without forgetting for classification and detection models.

SUMMARY

According to an embodiment described herein, a method is provided for incremental learning without forgetting for a classification/detection model. The method includes receiving, at a computing system, a classification/detection model including a base embedding space and corresponding base embedding vectors that are based on a base training dataset including base classes. The method also includes expanding the classification/detection model to account for a new training dataset including new classes by lifting the base embedding space to add an orthogonal subspace for the new classes, producing an expanded embedding space and corresponding expanded embedding vectors that are of a higher dimension than the base embedding vectors. In various embodiments, the method also includes expanding the expanded classification/detection model to account for another new training dataset including additional new classes by lifting the expanded embedding space to add another orthogonal subspace for the additional new classes.

In some embodiments, the classification/detection model is a representative-based classification/detection model. In addition, in some embodiments, the base training dataset and the new training dataset include image data, and the base classes and the new classes correspond to target objects within the image data.

In various embodiments, the method also includes, given an input image, detecting target objects from the base classes and the new classes using the expanded classification/detection model including the expanded embedding space. This may include using the base embedding space including the base embedding vectors to detect target objects from the base classes and using the expanded embedding space including the expanded embedding vectors that are of the higher dimension to detect target objects from the new classes.

Moreover, in some embodiments, the method includes lifting the base embedding space for at least one of a backbone, a region proposal network (RPN), or a classifier head of the classification/detection model. For example, in some embodiments, the classification/detection model is a representative-based detection model, and the base embedding space is lifted for at least the backbone and the classifier head.

In some embodiments, the method includes freezing the base embedding space and the corresponding base embedding vectors for the classification/detection model when the base embedding space is lifted to add the orthogonal subspace for the new classes. In addition, in some embodiments, the method includes reducing a dimension of the expanded embedding vectors using a distillation process. This may include using Deep-Image-Prior (DIP)-reconstruction-based methods to generate synthetic data representatives of the base classes to be used for the distillation process.

In another embodiment, a computing system is provided. The computing system includes an interface for receiving a classification/detection model including a base embedding space and corresponding base embedding vectors that are based on a base training dataset including base classes, as well as a new training dataset including new classes. The computing system also includes a processor and a computer-readable storage medium storing program instructions that direct the processor to expand the classification/detection model to account for the new training dataset including the new classes by lifting the base embedding space to add an orthogonal subspace for the new classes, producing an expanded embedding space and corresponding expanded embedding vectors that are of a higher dimension than the base embedding vectors. In various embodiments, the computer-readable storage medium also stores program instructions that direct the processor to further expand the expanded classification/detection model to account for another new training dataset including additional new classes by lifting the expanded embedding space to add another orthogonal subspace for the additional new classes.

In some embodiments, the classification/detection model is a representative-based classification/detection model. In addition, in some embodiments, the base training dataset and the new training dataset include image data, and the base classes and the new classes correspond to target objects within the image data.

In various embodiments, the computer-readable storage medium also stores program instructions that direct the processor to, given an input image, detect target objects from the base classes and the new classes using the expanded classification/detection model including the expanded embedding space. In addition, in some embodiments, the computer-readable storage medium stores program instructions that direct the processor to lift the base embedding space for at least one of a backbone, a region proposal network (RPN), or a classifier head of the classification/detection model.

In various embodiments, the computer-readable storage medium stores program instructions that direct the processor to freeze the base embedding space and the corresponding base embedding vectors for the classification/detection model when the base embedding space is lifted to add the orthogonal subspace for the new classes. Furthermore, in some embodiments, the computer-readable storage medium stores program instructions that direct the processor to reduce a dimension of the expanded embedding vectors using a distillation process.

In yet another embodiment, a computer program product is provided. The computer program product includes a computer-readable storage medium having program instructions embodied therewith, wherein the computer-readable storage medium is not a transitory signal per se. The program instructions are executable by a processor to cause the processor to receive a classification/detection model including a base embedding space and corresponding base embedding vectors that are based on a base training dataset including base classes. The program instructions are also executable by a processor to cause the processor to expand the classification/detection model to account for a new training dataset including new classes by lifting the base embedding space to add an orthogonal subspace for the new classes, producing an expanded embedding space and corresponding expanded embedding vectors that are of a higher dimension than the base embedding vectors. Furthermore, in various embodiments, the program instructions are also executable by the processor to cause the processor to further expand the expanded classification/detection model to account for another new training dataset including additional new classes by lifting the expanded embedding space to add another orthogonal subspace for the additional new classes.

DETAILED DESCRIPTION

Machine learning techniques can be used to build effective classification models and detection models. Such models can be used, for example, to classify images and detect the presence of particular target objects within the images. Moreover, such classification/detection models are trained on base training datasets including a number of base classes. However, when a new training dataset including new classes is to be added, such models often encounter a problem known as "catastrophic forgetting" (or "semantic drift"). Catastrophic forgetting occurs when the model is re-trained (or fine-tuned) on only the new training dataset, causing it to "forget" the base training dataset and, thus, have a strong bias towards the new classes.

Figure 1:
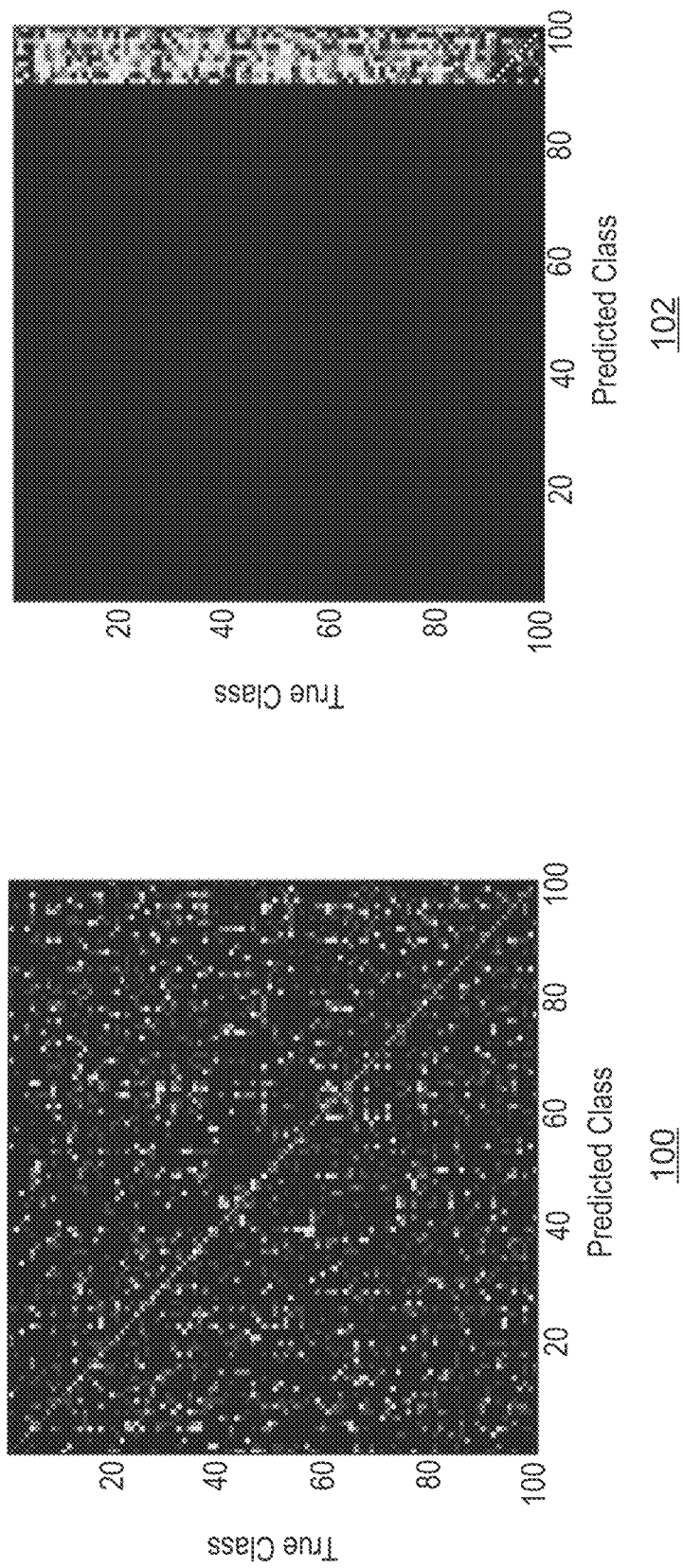
FIG. 1 is a graphical representation of the catastrophic forgetting problem that is solved by the techniques described herein.

FIG. 1 is a graphical representation of the catastrophic forgetting problem that is solved by the techniques described herein. Specifically, a first graph 100 shows the predicted class (along the x-axis) versus the true class (along the y-axis) for an exemplary implementation in which the classification/detection model is fully retrained using 90 bases classes (i.e., true classes 1-90) and 10 new classes (i.e., true classes 91-100). As shown in FIG. 1, when the model is fully retrained, there is no confusion or catastrophic forgetting because the predicated class is the true class. However, in many cases, the model cannot be fully retrained because the base training dataset is not available or the retraining process is too time-consuming. Therefore, a second graph 102 shows the predicated class versus the true class when the model is simply finetuned with the new training dataset. As shown in FIG. 1, this approach results in catastrophic forgetting because the model essentially forgets the base training dataset and is only able to accurately predict the new classes.

Incremental learning (also referred to as continual or lifelong learning) techniques can be used to mitigate the effects of catastrophic forgetting. In particular, incremental learning techniques enable models to acquire new knowledge from new data while still preserving knowledge learned from previous data. This is referred to as "learning without forgetting". According to current techniques, learning without forgetting for classification/detection models typically involves completely retraining the model on the union of both training datasets. However, in many cases, the base training dataset is not available. In addition, even in instances where the base training dataset has been saved for an extended period of time, retraining the model on the union of the two datasets can be computationally difficult and time-consuming. Furthermore, this technique may cause the model's performance on the base classes to deteriorate.

According to current techniques, there are three general methods for incremental learning without forgetting. The first method, referred to as the "rehearsal" method, involves mixing samples of data from the base training dataset with samples of data from a new training dataset and then retraining the model. The second method, referred to as the "regularization" method, involves adding constraints to the network's weight updates so that, when a new session is learned for a new training dataset, the new session is less likely to degrade the model's previously-learned knowledge and, thus, less likely to interfere with the model's performance for the base classes. The third method, referred to as the "dynamic architecture" method, involves changing the architectural properties of the model in response to the addition of the new training dataset. However, according to current techniques, the first two methods, i.e., rehearsal and regularization methods, are time-consuming and do not always produce accurate results. In addition, while the third method, i.e., the dynamic architecture method, has been explored to some extent, current techniques utilizing this method are not highly accurate in terms of retaining the model's ability to recognize base classes from previous sessions. Furthermore, current techniques generally focus on classification models, without providing an adequate solution for detection models.

Accordingly, the present disclosure describes improved techniques for incremental learning without forgetting for both classification and detection models. Specifically, the incremental learning without forgetting techniques described herein utilize the dynamic architecture method by growing and optimizing the embedding space using orthogonal subspaces. This is accomplished by "lifting" the embedding space or, in other words, adding dimensions to the embedding vectors within the embedding space. The values of the embedding space for the base classes are then zeroed out for the new dimensions and frozen with the previous values for the original dimensions, and the embedding space is only trained for the new classes corresponding to the new dimensions. In this manner, the new embedding space is expanded to include an orthogonal subspace and, whenever another new batch of data including new classes is added, another new orthogonal subspace is added to the embedding space. In various embodiments, by adding a new orthogonal subspace for each session including new classes, the techniques described herein enable the model to easily recognize the classes from previous sessions, thus effectively eliminating the catastrophic forgetting problem.

In various embodiments, the techniques described herein may be used to provide incremental learning without forgetting for representative-based models that use nearest neighbor classification with a set of representatives (or prototypes) for each class in the embedding space. An example of this type of model is a representative-based metric learning (RepMet) model for classification/detection and few-shot object classification/detection. This type of model is generated by jointly training a model backbone, an embedding space, and mixture models for the resulting classes. In particular, this type of model extracts features from the training dataset and then learns a common embedding space for the resulting embedding vectors (or feature vectors), where the term "embedding space" refers to a linear vector space within a deep neural network architecture that hosts the embedding vectors. Within the embedding space, the embedding vectors are clustered with their nearest neighbors, resulting in an embedding space including groups of embedding vectors clustered according to class (or type). Moreover, one or more class representatives may be determined for each class by determining a mixture mode center for each class in the embedding space. The classification of a query can then be achieved according to the class of the representative closest to the query embedding vector in the embedding space, using a nearest neighbor method.

In the case of detection models, the detection of target objects using the representative-based model can be achieved using a region proposal network (RPN) in combination with a classifier head. Specifically, the RPN is used to generate hypothesis boxes, referred to as "bounding boxes", including possible target objects, while the classifier head is used to classify the bounding boxes. Moreover, both the RPN and the classifier head sit on top of a shared neural network starting directly on the inputs, which is referred to as the model "backbone".

While embodiments described herein generally relate to the implementation of the present techniques for representative-based models, it will be appreciated by one of skill in the art that the present techniques may also be implemented for any other suitable type of classification and/or detection model. In addition, while embodiments described herein relate to the use of the present techniques for classifying and/or detecting people, places, or items within images or videos, it will be appreciated by one of skill in the art that the present techniques can also be used to classify and/or detect any other suitable types of target objects, such as, for example, songs or voices in audio recordings, or words or topics within documents.

Figure 2:
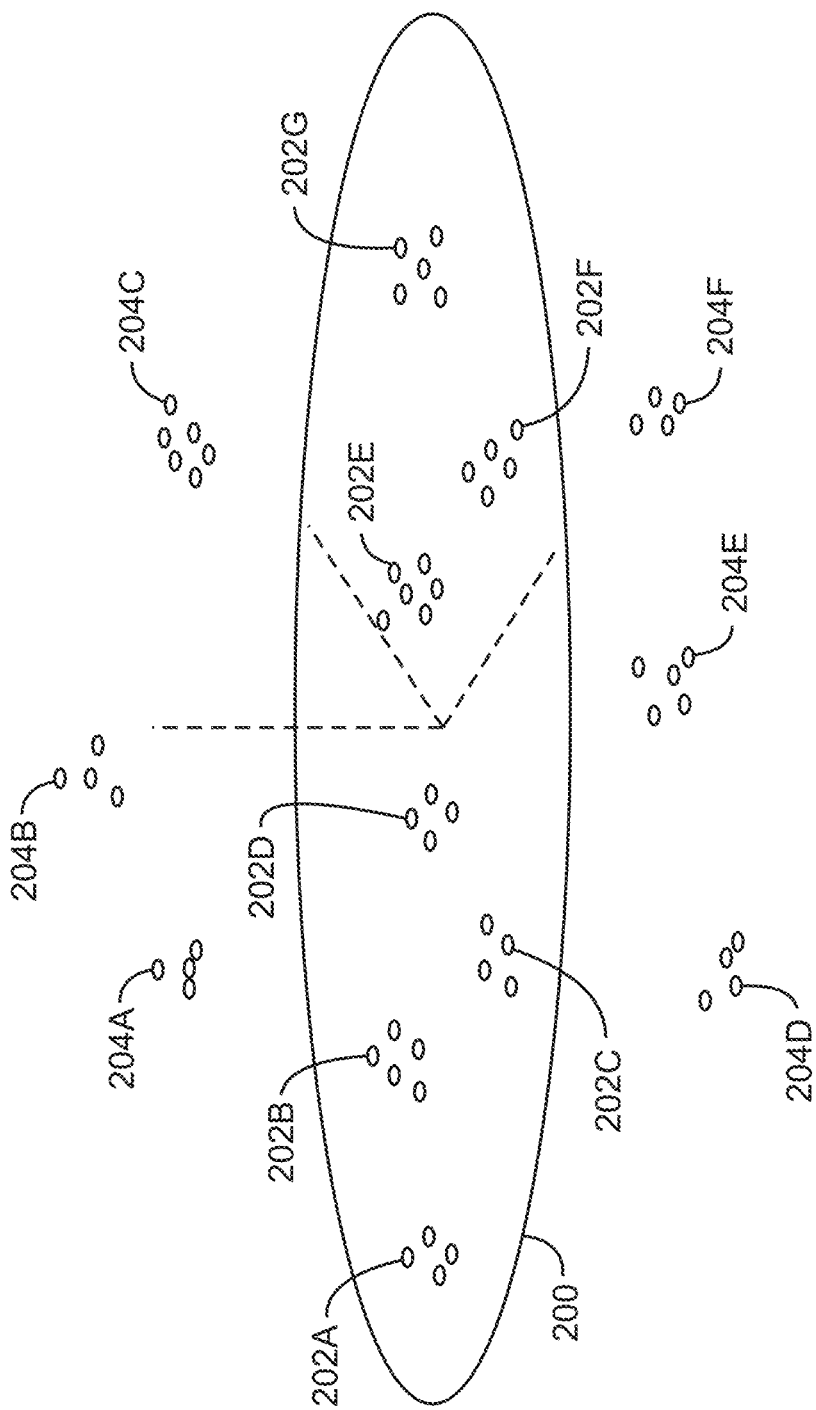
FIG. 2 is a schematic view of an exemplary representation of an embedding space that is "lifted" according to embodiments described herein.

FIG. 2 is a schematic view of an exemplary representation of an embedding space 200 that is "lifted" according to embodiments described herein. As shown in FIG. 2, the base classes 202A-G exist within the base embedding space 200, which is a two-dimensional plane according to the embodiment shown in FIG. 2 (although a three-dimensional or even higher-dimensional embedding space can also be used). According to embodiments described herein, when a new training dataset including new classes 204A-F is added to the model, an additional dimension is added to the base embedding space 200. This produces an expanded embedding space in which the new classes 204A-F exist within an orthogonal subspace, which is above and below the embedding space 200 according to the embodiment shown in FIG. 2. In practice, adding new layers to the embedding space 200 in this manner allows the model to be trained for the new layers while the previous layers remain frozen. In other words, the new classes can be added to the model without affecting the model's performance on the base classes. As described herein, this is a form of incremental learning without forgetting that eliminates the common problem of catastrophic forgetting.

According to embodiments described herein, the embedding space can be lifted on different depth levels (or layers) within the neural network, depending on the details of the particular implementation. For example, when the expanded embedding space is used for a detection model, the embedding space may be lifted in both the RPN phase and the final classifier phase, as described further with respect to FIG. 3.

In various embodiments, the neural network wiring is set such that the original neural network remains as a fixed sub-network of the expanded neural network, and the entire processing of the original neural network is not affected by the update. The computation pathways leading to new class predictors are allowed to ingest both the original feature space and the orthogonal component added for the new class predictors.

Furthermore, for embodiments in which computer memory space is limited, a distillation process can then be used to reduce the embedding space back to the previous network size by teaching the smaller neural network to produce outputs of the larger neural network. Specifically, because adding the orthogonal subspace increases the number of network parameters, the distillation process may be used to reduce the size of the model back to the original number of network parameters. In some embodiments, because the base dataset is no longer available at this stage, Deep-Image-Prior (DIP)-reconstruction-based methods can be used to generate synthetic data representatives of the base classes to be used for the distillation process. Moreover, in some embodiments, the distillation process is a master/slave speculative parallelization (MSSP) process, although one of skill in the art will appreciate that any other suitable type of distillation process may also be used.

Figure 3:
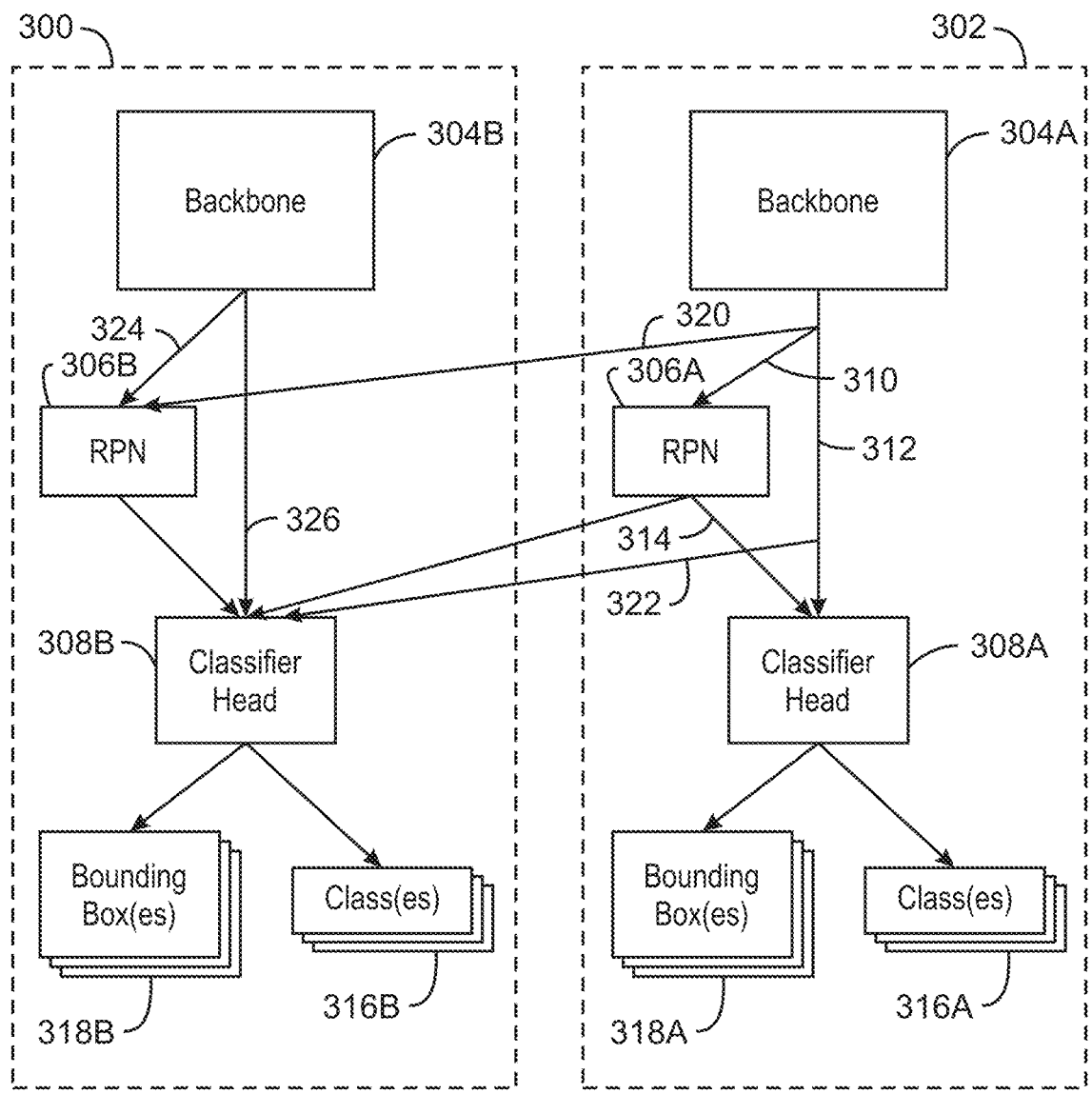
FIG. 3 is a schematic view showing the layers of an expanded representative-based detection model as compared to the layers of a base representative-based detection model according to an exemplary implementation of the techniques described herein.

FIG. 3 is a schematic view showing the layers of an expanded representative-based detection model 300 as compared to the layers of a base representative-based detection model 302 according to an exemplary implementation of the techniques described herein. As shown in FIG. 3, the base representative-based detection model 302 includes a backbone 304A, a region proposal network (RPN) 306A, and a classifier head 308A. The backbone 304A includes the base training dataset that is used to build the base representative-based detection model 302. In particular, the base representative-based detection model 302 is built by extracting features from the base training dataset and learning a common embedding space for the resulting embedding vectors. Information relating to the base representative-based detection model 302 is then output to the RPN 306A and the classifier head 308A, as indicated by arrows 310 and 312, respectively.

When the base representative-based detection model 302 receives an input image, the backbone outputs the input image to the RPN 306A and the classifier head 308A. The RPN 306A then analyzes the input image to identify any number of bounding box proposals, which are areas of the input image that may include target objects. The query embedding vectors corresponding to the bounding box proposals are then sent to the classifier head 308A, as indicated by arrow 314. The classifier head 308A compares the query embedding vectors to the embedding vectors within the embedding space to determine final class(es) 316A and final bounding box(es) 318A for the target object(s) within the input image. This may be accomplished by comparing each query embedding vector to the class representatives within the embedding space to determine the class to which each query embedding vector belongs (if any). In various embodiments, a nearest neighbor method is used for this purpose.

In some cases, it may be desirable to expand the base representative-based detection model 302 based on a new training dataset including new classes that were not included within the base training dataset. Therefore, as shown in FIG. 3, the expanded representative-based detection model 300 is generated for this purpose. In particular, the expanded representative-based detection model 300 also includes a backbone 304B, a region proposal network (RPN) 306B, and a classifier head 308B. However, in contrast to the RPN 306A and the classifier head 308A for the base representative-based detection model 302, the RPN 306B and the classifier head 308B for the expanded representative-based detection model 300 may utilize expanded embedding vectors including additional dimensions that account for both the embedding space generated based on the base training dataset and the orthogonal subspace generated based on the new training dataset, as indicated by arrows 320 and 322, and arrows 324 and 326, respectively. In other words, for this exemplary implementation, the embedding space of the base representative-based detection model 302 is lifted in the both the RPN phase and the final classifier phase to generate the expanded representative-based detection model 300.

As a result of this process, the RPN 306B for the expanded representative-based detection model 300 is capable of identifying additional bounding box proposals relating to the new classes without compromising the model's accuracy with respect to the base classes. In addition, the classifier head 308B for the expanded representative-based detection model 300 can determine final class(es) 316B and final bounding box(es) 318B for a wider range of target objects within the input image.

In various embodiments, the layers of the expanded representative-based detection model 300 can be seen as an enlargement of the layers of the base representative-based detection model 302. For example, the RPN layer for the expanded representative-based detection model 300 is the concatenation of the RPN 306A for the base representative-based detection model 302 and the RPN 306B for the expanded representative-based detection model 300, while the classifier layer for the expanded representative-based detection model 300 is the concatenation of the classifier head 308A for the base representative-based detection model 302 and the classifier head 308B for the expanded representative-based detection model 300. In this manner, the dimension of the embedding vector is increased for the layers of the expanded representative-based detection model 300.

In addition, in various embodiments, all the layers of the base representative-based detection model 302 are frozen during generation of the expanded representative-based detection model 300 to prevent degradation of the model's performance on the base classes. Moreover, in various embodiments, the classifier head 308B for the expanded representative-based detection model 300 behaves differently for base classes versus new classes. In particular, when the classifier head 308B compares the query embedding vector to the class representatives for the base classes, it may only use the base dimensions for the embedding vector within the embedding space. In contrast, when the classifier head 308B compares the query embedding vector to the new class representatives 418B for the new classes, it may use all the dimensions for the expanded embedding vector within the embedding space.

Additionally or alternatively, in some embodiments, several image samples from the base training dataset can be saved with the base classes. The image samples can then be used along with the new training dataset to generate the layers of the expanded representative-based detection model 300. In such embodiments, a simple nearest neighbor classifier can be used for this purpose.

It will be appreciated by one of skill in the art that, while FIG. 3 describes a representative-based detection model, appropriate adaptations of the techniques described with respect to FIG. 3 can be equally applied to any other suitable type of detection model. In addition, appropriate adaptations of the techniques described with respect to FIG. 3 can also be applied to a representative-based classification model (or any other suitable type of classification model). However, for a representative-based classification model, the RPN is not present since the bounding box in that case is effectively the entire image.

Figure 4:
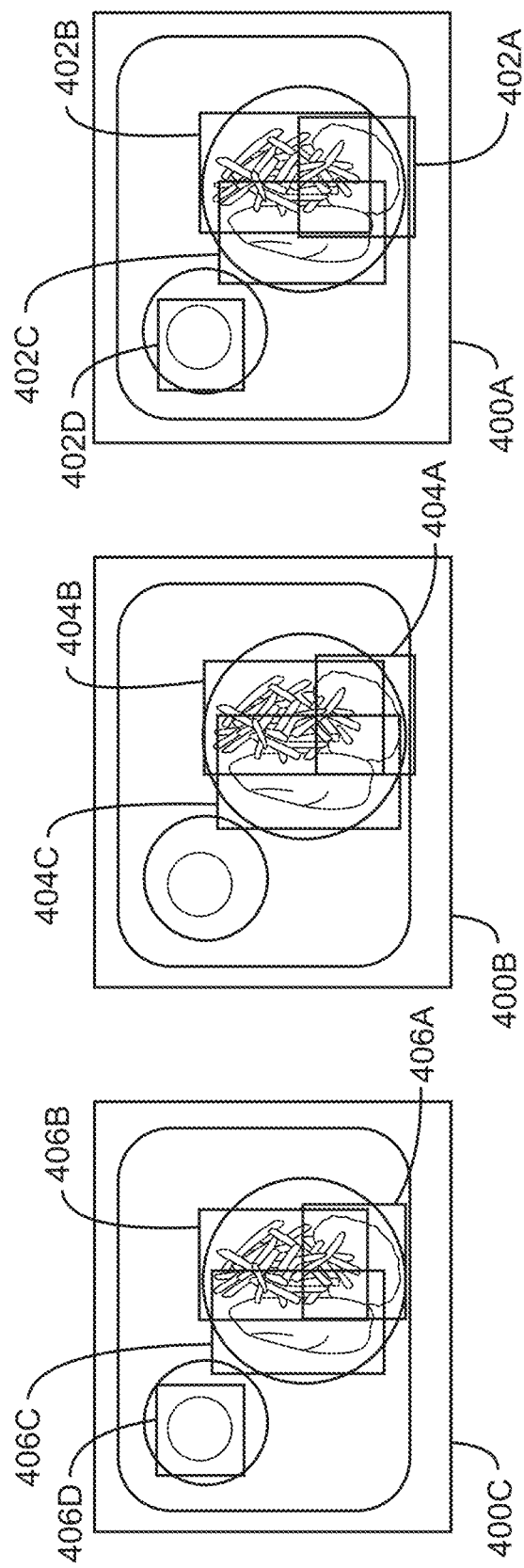
FIG. 4 is a schematic view showing a comparison of results obtained using both the base model and the expanded model to detect target objects within an image according to an exemplary implementation of the techniques described herein.

FIG. 4 is a schematic view showing a comparison of results obtained using both the base model and the expanded model to detect target objects within an image according to an exemplary implementation of the techniques described herein. Specifically, according to the exemplary implementation shown in FIG. 4, the base model was trained to detect 123 different types of food items on a tray, where each food item was saved as a base class within the model. Subsequently, the model was expanded according to the techniques described herein to include 20 new food items and, thus, 20 new classes.

As shown by a first schematic view 400A in FIG. 4, the ground truth classification/detection for an image input to the model includes four different classes of food items, as represented by bounding boxes 402A-D. However, as shown by a second schematic view 400B, the base model was only able to classify/detect three out of the four food items, as represented by bounding boxes 404A-C. Moreover, as shown by a third schematic view 400C, once the model was expanded to include the new classes, the model was able to accurately classify/detect all four food items, thus closely approximately the ground truth classification/detection for the image. In particular, the results of this exemplary implementation showed that the expanded model had a mean average precision (mAP) of around 92%, which marginally exceeds the mAP that is typically obtained by fully retraining the model with both datasets. Accordingly, in addition to saving computational resources and time, the techniques described herein may provide increased accuracy over previous techniques for incremental learning without forgetting.

Figure 5:
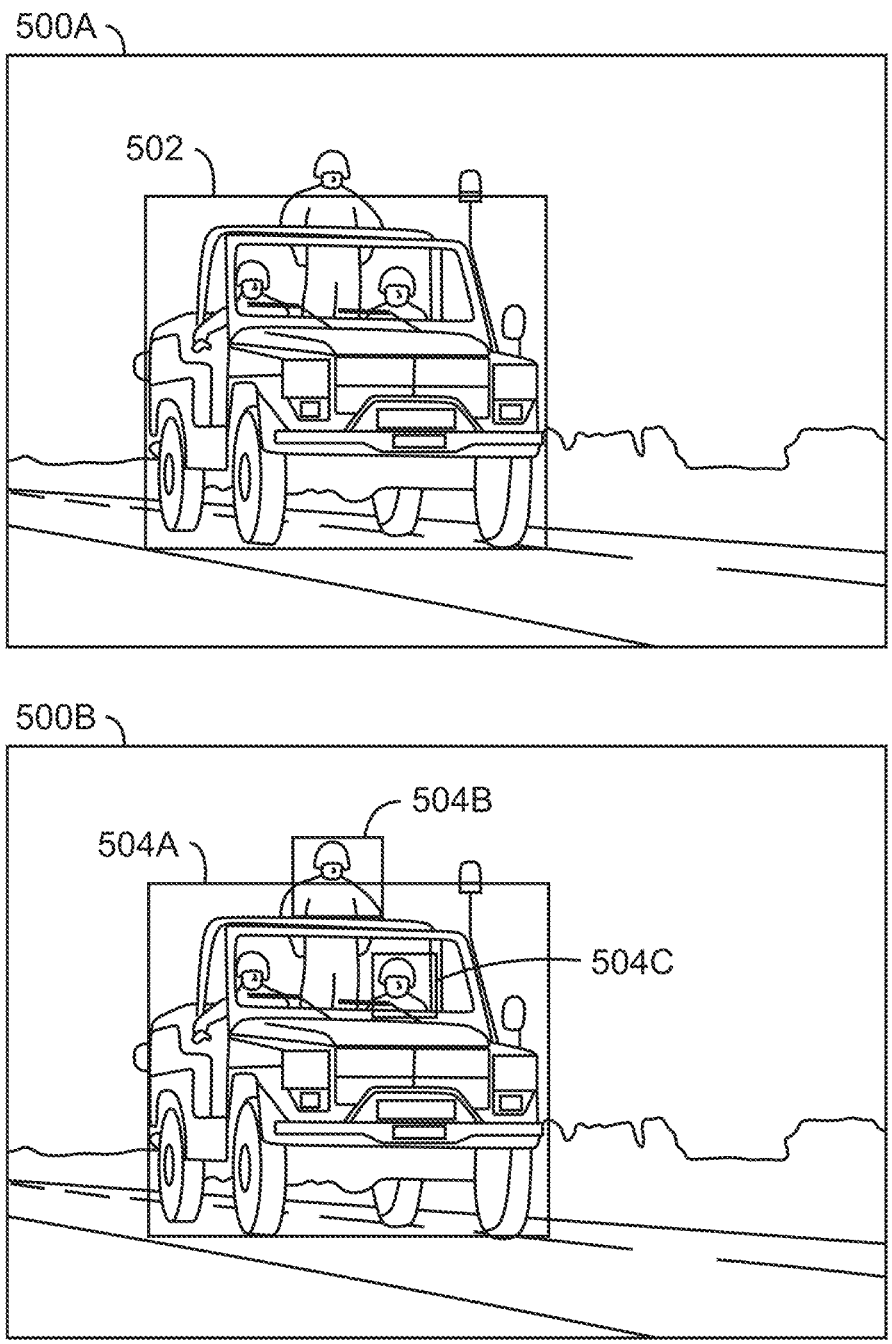
FIG. 5 is another schematic view showing a comparison of results obtained using both the base model and the expanded model to detect target objects within an image according to another exemplary implementation of the techniques described herein.

FIG. 5 is another schematic view showing a comparison of results obtained using both the base model and the expanded model to detect target objects within an image according to another exemplary implementation of the techniques described herein. Specifically, according to the exemplary implementation shown in FIG. 5, the base model was trained on 10 base classes: airplane, bicycle, bird, boat, bottle, bus, car, cat, chair, and cow. The model was then expanded according to the techniques described herein to include 10 new classes: dining table, dog, horse, motorbike, person, potted plant, sheep, sofa, train, and television monitor.

When an image was input to the base model, the base model was able to detect the car within the image, as shown by a first schematic view 500A including a bounding box 502. However, when the image was input to the expanded model, the expanded model was able to successfully detect the car and two people within the image, as shown by a second schematic view 500B including three bounding boxes 504A-C.

Furthermore, in various embodiments, the mean average precision (mAP) of the expanded model increased depending on the number of layers for which the embedding space was lifted. Specifically, the expanded model had the highest mAP when the embedding space was lifted for the backbone, the RPN, and the classifier head, while the expanded model had the lowest mAP when the embedding space was only lifted for the classifier head.

Figure 6:
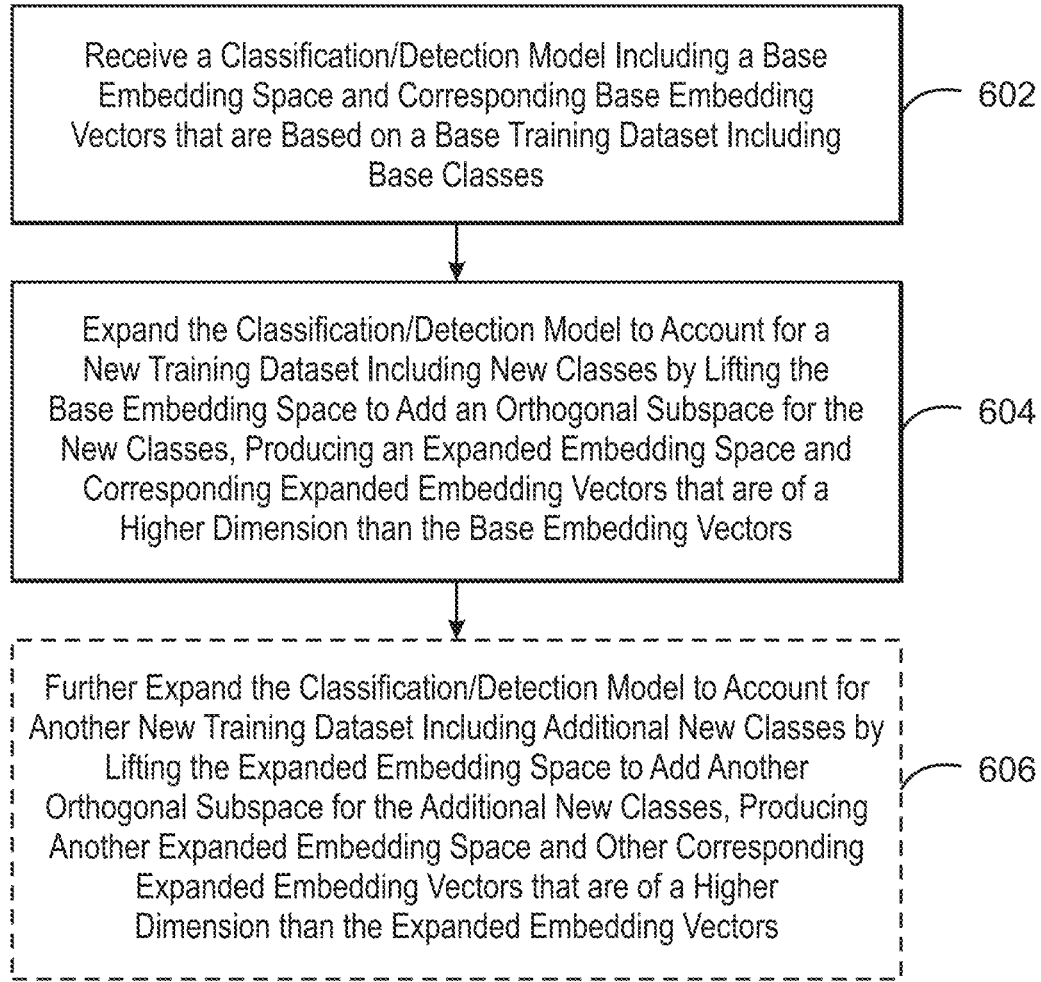
FIG. 6 is a process flow diagram of a method for incremental learning without forgetting according to embodiments described herein.

FIG. 6 is a process flow diagram of a method for incremental learning without forgetting according to embodiments described herein. In various embodiments, the method 600 is implemented by a computing system, such as the computing system 700 described with respect to FIG. 7. In particular, the method 600 may be performed by one or more processors via the execution of one or more modules stored within one or more computer-readable storage media, as described further with respect to FIG. 7.

The method 600 begins at block 602, at which a classification/detection model including a base embedding space and corresponding base embedding vectors that are based on a base training dataset including base classes is received. In some embodiments, the classification/detection model is a representative-based classification/detection model, such as a representative-based metric learning (RepMet) model for classification/detection and few-shot object classification/detection.

At block 604, the classification/detection model is expanded to account for a new training dataset including new classes by lifting the base embedding space to add an orthogonal subspace for the new classes, producing an expanded embedding space and corresponding expanded embedding vectors that are of a higher dimension than the base embedding vectors. In some embodiments, the base embedding space is lifted for at least one of a backbone, a region proposal network (RPN), or a classifier head of the classification/detection model. For example, when the classification/detection model is a representative-based detection model, the base embedding space may be lifted for at least the RPN and the classifier head.

In some embodiments, the base embedding space and the corresponding base embedding vectors are frozen when the base embedding space is lifted to add the orthogonal subspace for the new classes. Moreover, in some embodiments, the dimension of the expanded embedding vectors is then reduced using a distillation process. In such embodiments, DIP-reconstruction-based methods may be used to generate synthetic data representatives of the base classes to be used for the distillation process.

In addition, in some embodiments, the base training dataset and the new training dataset include image data, and the base classes and the new classes correspond to target objects within the image data. In such embodiments, the method 600 may further include, given an input image, detecting target objects from the base classes and the new classes using the expanded classification/detection model including the expanded embedding space. This may include using the base embedding space including the base embedding vectors to detect target objects from the base classes and using the expanded embedding space including the expanded embedding vectors that are of the higher dimension to detect target objects from the new classes.

Furthermore, at optional block 606, the classification/detection model may be further expanded to account for another new training dataset including additional new classes by lifting the expanded embedding space to add another orthogonal subspace for the additional new classes, producing another expanded embedding space and additional corresponding expanded embedding vectors that are of a higher dimension than the expanded embedding vectors.

The block diagram of FIG. 6 is not intended to indicate that the blocks 602-606 of the method 600 are to be executed in any particular order, or that all of the blocks 602-606 of the method 600 are to be included in every case. Moreover, any number of additional blocks may be included within the method 600, depending on the details of the specific implementation.

Figure 7:
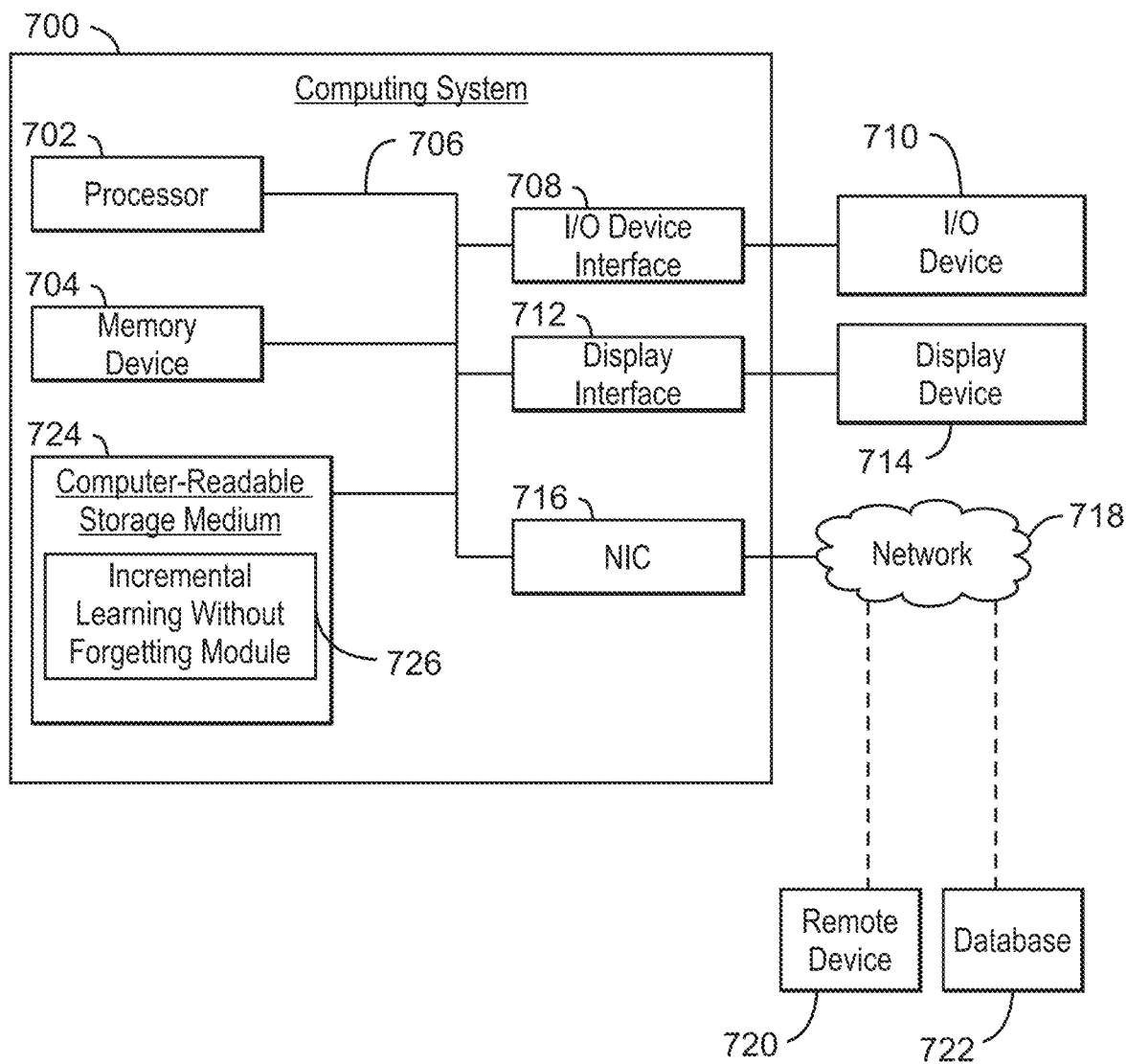
FIG. 7 is a simplified block diagram of an exemplary computing system that can be used to implement the incremental learning without forgetting techniques described herein.

FIG. 7 is a simplified block diagram of an exemplary computing system 700 that can be used to implement the incremental learning without forgetting techniques described herein. The computing system 700 may include one or more servers, one or more general-purpose computing devices, one or more special-purpose computing devices, one or more virtual machines, and/or any other suitable type(s) of computing device(s). As an example, the computing system 700 may be a desktop computer, a laptop computer, a tablet computer, or a smartphone. Moreover, in some embodiments, the computing system 700 is a cloud computing node.

The computing system 700 includes a processor 702 that is adapted to execute stored program instructions, such as program modules, as well as a memory device 704 that provides temporary memory space for the program instructions during execution. The processor 702 can include any suitable processing unit or device, such as, for example, a single-core processor, a single-core processor with software multithread execution capability; a multi-core processor, a multi-core processor with software multithread execution capability, a computing cluster, parallel platforms, parallel platforms with shared memory, or any number of other configurations. Moreover, the processor 702 can include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein. The memory device 704 can include volatile memory components, nonvolatile memory components, or both volatile and nonvolatile memory components. Nonvolatile memory components may include, for example, read only memory (ROM), programmable ROM (PROM), electrically programmable ROM (EPROM), electrically erasable ROM (EEROM), flash memory, or non-volatile random access memory (RAM) (e.g., ferroelectric RAM (FeRAM). Volatile memory components may include, for example, RAM, which can act as external cache memory. RAM is available in many forms, such as, for example, synchronous RAM (SRAM), dynamic RAM (DRAM), synchronous dynamic RAM (SDRAM), and the like.

In some embodiments, the computing system 700 is practiced in a distributed cloud computing environment where tasks are performed by remote processing devices that are linked through a communications network. In a distributed cloud computing environment, program modules may be located in both local and remote computing devices.

The processor 702 is connected through a system interconnect 706 (e.g., PCI®, PCI-Express®, etc.) to an input/output (I/O) device interface 708 adapted to connect the computing system 700 to one or more I/O devices 710. The I/O devices 710 may include, for example, a keyboard and a pointing device, where the pointing device may include a touchpad or a touchscreen, among others. The I/O devices 710 may be built-in components of the computing system 700, or may be devices that are externally connected to the computing system 700.

The processor 702 is also linked through the system interconnect 706 to a display interface 712 adapted to connect the computing system 700 to a display device 714. The display device 714 may include a display screen that is a built-in component of the computing system 700. The display device 714 may also include a computer monitor, television, or projector, among others, that is externally connected to the computing system 700. In addition, a network interface controller (NIC) 716 is adapted to connect the computing system 700 through the system interconnect 706 to the network 718. In some embodiments, the NIC 716 can transmit data using any suitable interface or protocol, such as the internet small computer system interface, among others. The network 718 may be a cellular network, a radio network, a wide area network (WAN), a local area network (LAN), or the Internet, among others. The network 718 may include associated copper transmission cables, optical transmission fibers, wireless transmission devices, routers, firewalls, switches, gateway computers, edge servers, and the like.

One or more remote devices 720 may optionally connect to the computing system 700 through the network 718. In addition, one or more databases 722 may optionally connect to the computing system 700 through the network 718. In some embodiments, the one or more databases 722 store data relating to machine learning tasks. For example, the database(s) 722 may include training datasets for a classification/detection model. In such embodiments, the computing system 700 may access or download at least a portion of the training datasets during the incremental learning without forgetting process described herein.

The computing system 700 also includes a computer-readable storage medium (or media) 724 that includes program instructions that may be executed by the processor 702 to perform various operations, such as the incremental learning without forgetting process described herein. The computer-readable storage medium 724 may be integral to the computing system 700, or may be an external device that is connected to the computing system 700 when in use. The computer-readable storage medium 724 may include, for example, an electronic storage device, a magnetic storage device, an optical storage device, an electromagnetic storage device, a semiconductor storage device, or any suitable combination of the foregoing. A non-exhaustive list of more specific examples of the computer-readable storage medium 724 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. Moreover, the term "computer-readable storage medium," as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In some embodiments, the NIC 716 receives program instructions from the network 718 and forwards the program instructions for storage in the computer-readable storage medium 724 within the computing system 700.

Generally, the program instructions, including the program modules, may include routines, programs, objects, components, logic, data structures, and so on that perform particular tasks or implement particular abstract data types. For example, the program instructions may include assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++, or the like, and conventional procedural programming languages, such as the "C" programming language or similar programming languages. The program instructions may execute entirely on the computing system 700, partly on the computing system 700, as a stand-alone software package, partly on the computing system 700 and partly on a remote computer or server connected to the computing system 700 via the network 718, or entirely on such a remote computer or server. In some embodiments, electronic circuitry including, for example, programmable logic circuitry, field-programmable gate arrays (FPGA), or programmable logic arrays (PLA) may execute the program instructions by utilizing state information of the program instructions to personalize the electronic circuitry, in order to perform aspects of the incremental learning without forgetting techniques described herein.

According to embodiments described herein, the computer-readable storage medium 724 includes one or more program modules (and/or sub-modules) for performing the incremental learning without forgetting process described herein. Specifically, the computer-readable storage medium 724 includes an incremental learning without forgetting module 726 for expanding a classification/detection model to include new classes while avoiding catastrophic forgetting of the base classes. The manner in which this module may be executed to perform the incremental learning without forgetting process described herein is explained further with respect to FIGS. 2-6.

It is to be understood that the block diagram of FIG. 7 is not intended to indicate that the computing system 700 is to include all of the components shown in FIG. 7. Rather, the computing system 700 can include fewer or additional components not illustrated in FIG. 7 (e.g., additional processors, additional memory components, embedded controllers, additional modules, additional network interfaces, etc.). Furthermore, any of the functionalities relating to the incremental learning without forgetting process described herein are partially, or entirely, implemented in hardware and/or in the processor 702. For example, such functionalities may be implemented with an ASIC, logic implemented in an embedded controller, and/or in logic implemented in the processor 702, among others. In some embodiments, the functionalities relating to the incremental learning without forgetting process described herein are implemented with logic, wherein the logic, as referred to herein, can include any suitable hardware (e.g., a processor, among others), software (e.g., an application, among others), firmware, or any suitable combination of hardware, software, and firmware.

The present techniques may be a computing system, a method, and/or a computer program product. The computer program product may include a computer-readable storage medium (or media) having computer-readable program instructions thereon for causing a processor to carry out aspects of the present techniques.

Aspects of the present techniques are described herein with reference to flowchart illustrations and/or block diagrams of methods, apparatus (systems), and computer program products according to embodiments of the present techniques. It will be understood that each block of the flowchart illustrations and/or block diagrams, and combinations of blocks in the flowchart illustrations and/or block diagrams, can be implemented by computer-readable program instructions.

The flowchart and block diagrams in the figures illustrate the architecture, functionality, and operation of possible implementations of systems, methods, and computer program products according to various embodiments of the present techniques. In this regard, each block in the flowchart or block diagrams may represent a module, segment, or portion of instructions, which includes one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

Figure 8:
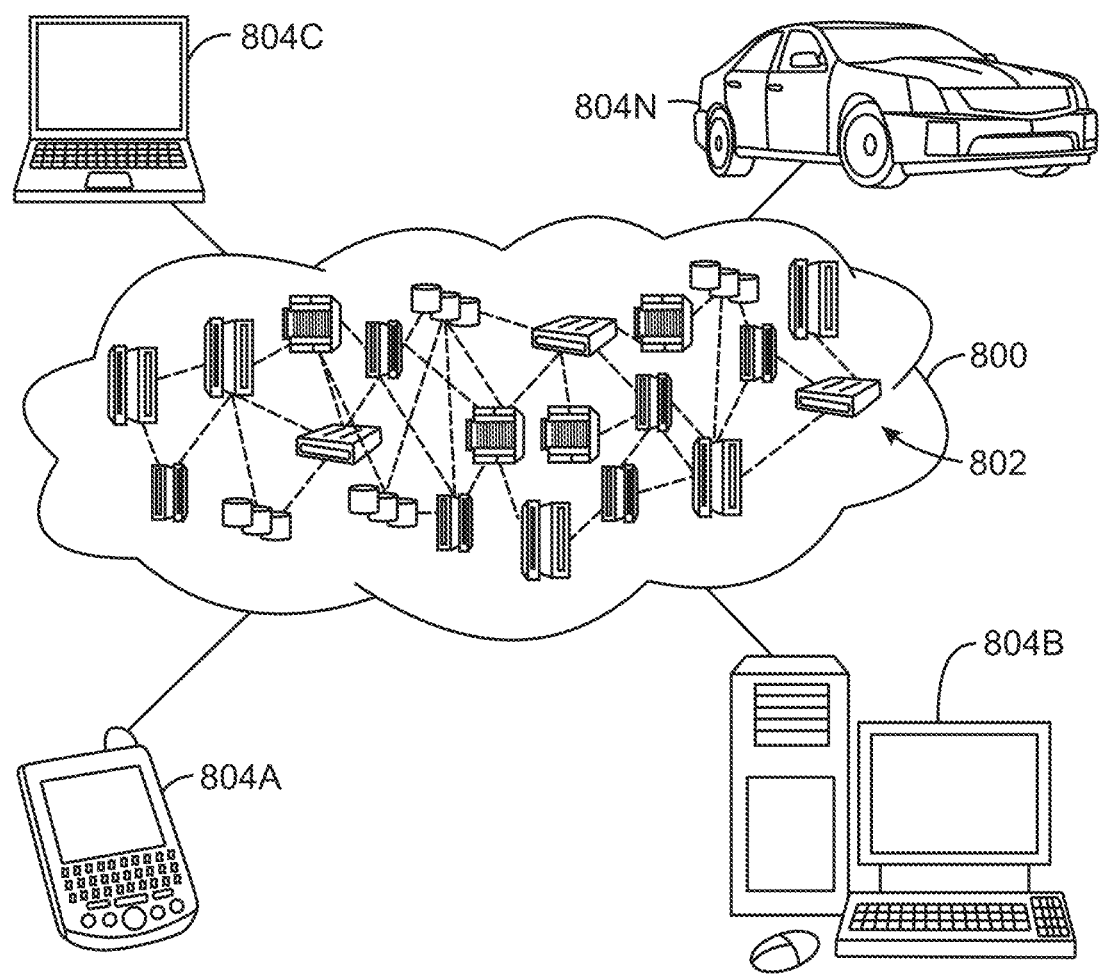
FIG. 8 is a schematic view of an exemplary cloud computing environment that can be used to implement the incremental learning without forgetting techniques described herein.
Figure 9:
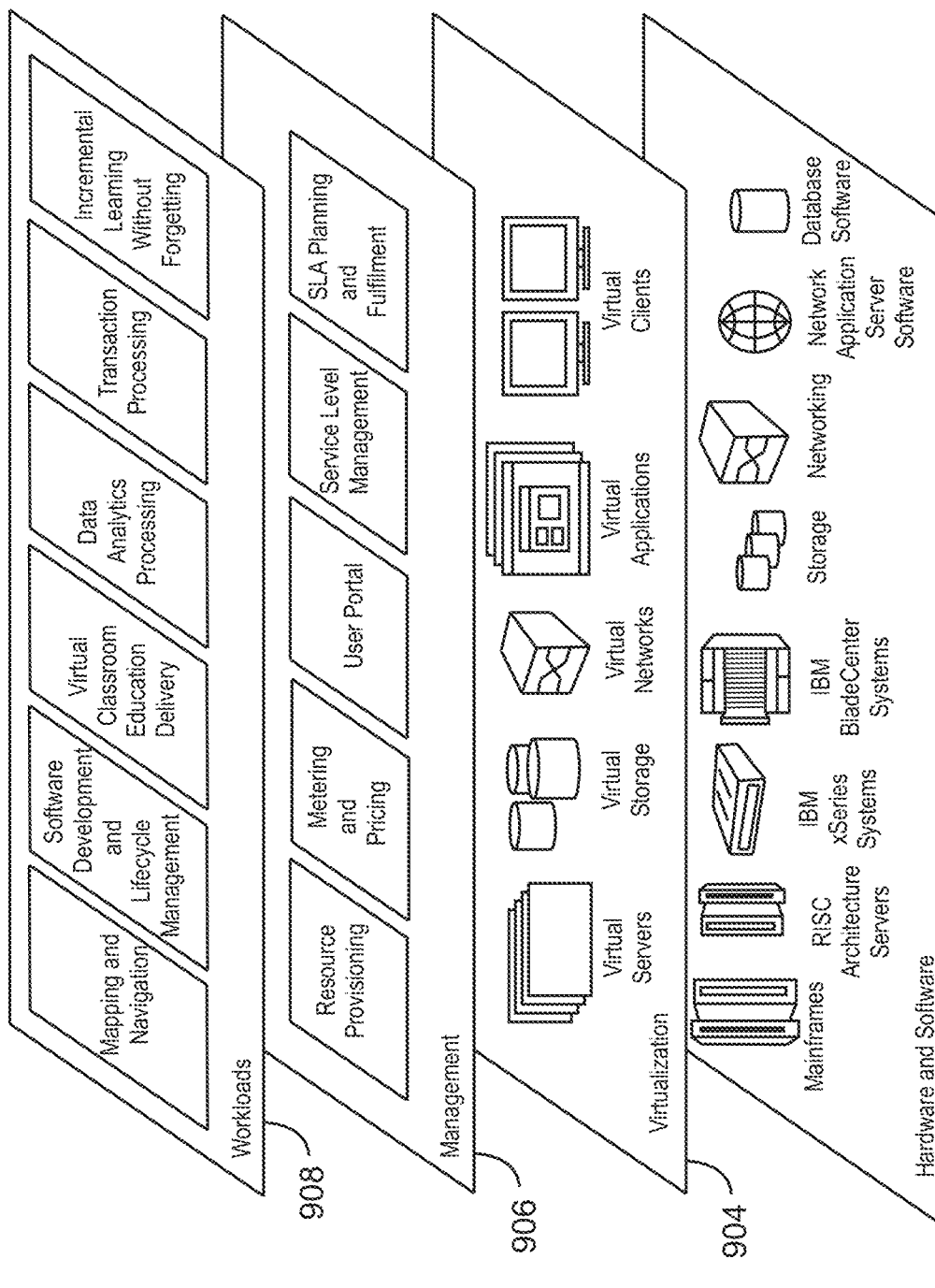
FIG. 9 is a simplified schematic view of exemplary functional abstraction layers provided by the cloud computing environment of FIG. 8 according to embodiments described herein.

In some scenarios, the incremental learning without forgetting techniques described herein may be implemented in a cloud computing environment, as described in more detail with respect to FIGS. 8 and 9. It is understood in advance that although this disclosure may include a description of cloud computing, implementation of the techniques described herein is not limited to a cloud computing environment. Rather, embodiments of the present techniques are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing units, memory, storage devices, applications, virtual machines, and services) that can be rapidly provisioned and released with minimal management effort or interaction with a provider of the service. This cloud model may include at least five characteristics, at least three service models, and at least four deployment models.

The at least five characteristics are as follows:

(1) On-demand self-service: A cloud consumer can unilaterally provision computing capabilities, such as server time and network storage, as needed automatically without requiring human interaction with the service's provider.

(2) Broad network access: Capabilities are available over a network and accessed through standard mechanisms that promote use by heterogeneous thin or thick client platforms (e.g., mobile phones, laptops, and PDAs).

(3) Resource pooling: The provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

(4) Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

(5) Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The at least three service models are as follows:

(1) Software as a Service (SaaS): The capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

(2) Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

(3) Infrastructure as a Service (IaaS): The capability provided to the consumer is to provision processing, storage, networks, and other fundamental computing resources, where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The at least four deployment models are as follows:

(1) Private cloud: The cloud infrastructure is operated solely for an organization. It may be managed by the organization or a third party and may exist on-premises or off-premises.

(2) Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

(3) Public cloud: The cloud infrastructure is made available to the general public or a large industry group and is owned by an organization selling cloud services.

(4) Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure including a network of interconnected nodes.

FIG. 8 is a schematic view of an exemplary cloud computing environment 800 that can be used to implement the incremental learning without forgetting techniques described herein. As shown, cloud computing environment 800 includes one or more cloud computing nodes 802 with which local computing devices used by cloud consumers, such as, for example, personal digital assistant (PDA) or cellular telephone 804A, desktop computer 804B, laptop computer 804C, and/or automobile computer system 804N may communicate. The cloud computing nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804A-N shown in FIG. 8 are intended to be illustrative only and that the cloud computing nodes 802 and cloud computing environment 800 can communicate with any type of computerized device over any type of network and/or network addressable connection (e.g., using a web browser).

FIG. 9 is a simplified schematic view of exemplary functional abstraction layers 900 provided by the cloud computing environment 800 shown in FIG. 8 according to embodiments described herein. It should be understood in advance that the components, layers, and functions shown in FIG. 9 are intended to be illustrative only and embodiments of the present techniques are not limited thereto. As depicted, the following layers and corresponding functions are provided.

Hardware and software layer 902 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 904 provides an abstraction layer from which the following examples of virtual entities may be provided: virtual servers; virtual storage; virtual networks, including virtual private networks; virtual applications and operating systems; and virtual clients. In one example, management layer 906 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 908 provides examples of functionality for which the cloud computing environment may be utilized. Examples of workloads and functions which may be provided from this layer include: mapping and navigation; software development and lifecycle management; virtual classroom education delivery; data analytics processing; transaction processing; and executing incremental learning without forgetting techniques.

The system(s), method(s), and computer program product(s) described herein provide a technical solution to the technical problem of accurately classifying and/or detecting target objects within images using a classification/detection model. This may be particularly useful in the application domain of identifying retail products in an image, such as, for example, identifying multiple instances of specific retail products on multiple shelves. In addition, the system(s), method(s), and computer program product(s) described herein improve the performance of a computing device that identifies target objects within images by reducing the data storage requirements and/or reducing the computational difficulty (in terms of processor utilization and/or processing time) for identifying such target objects. Furthermore, the system(s), method(s), and computer program product(s) described herein improve an underlying technical process within the field of image processing, in particular, within the field of automatic detection and recognition of target objects within images.

The system(s), method(s), and computer program product(s) described herein are tied to physical real-life components, including, for example, a camera that captures images and a data storage device that stores a repository of data relating to classification/detection models. Accordingly, the system(s), method(s), and computer program product(s) described herein are inextricably tied to computing technology and/or physical components to overcome an actual technical problem arising in the processing of digital images.

The descriptions of the various embodiments of the present techniques have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for incremental learning without forgetting for a classification/detection model, comprising:
    receiving, at a computing system, a classification/detection model comprising a base embedding space and corresponding base embedding vectors that are based on a base training dataset comprising base classes;

adding a new training dataset including new classes to the classification/detection model to expand the classification/detection model;

adding a new dimension to the base embedding space in response to adding the new training dataset including the new classes to the classification/detection model thereby producing an expansion of the base embedding space forming an expanded embedding space in which the new classes exist within an orthogonal subspace which is above and below the base embedding space;

training the classification/detection model for the expanded embedding space which includes the base classes and the new classes thereby enabling the classification/detection model to recognize classes from previous sessions thereby eliminating a catastrophic forgetting problem, wherein the classification/detection model comprises a backbone, a region proposal network, and a classifier head, wherein the region proposal network and the classifier head utilize expanded embedding vectors including additional dimensions that account for both the base embedding space and the orthogonal subspace thereby increasing a dimension of an embedding vector for layers of the classification/detection model; and freezing all layers of the classifier/detection model during generation of an expansion of the classifier/detection model, wherein the classifier head uses all dimensions for an expanded embedding vector within the expanded embedding space to compare a query embedding vector to a new class representative for the new classes.

2. The method of claim 1, comprising:

zeroing out values of the expanded embedding space for the base classes for the new dimension; and freezing values of the expanded embedding space for the base classes for original dimensions.

3. The method of claim 1, wherein the base training dataset and the new training dataset comprise image data, and wherein the base classes and the new classes correspond to target objects within the image data.

4. The method of claim 3, comprising, given an input image, detecting target objects from the base classes and the new classes using the classification/detection model comprising the expanded embedding space.

5. The method of claim 4, comprising:

using the base embedding space comprising the base embedding vectors to detect target objects from the base classes; and using the expanded embedding space comprising expanded embedding vectors that are of the higher dimension to detect target objects from the new classes.

6. The method of claim 1, wherein the classification/detection model is a representative-based detection model, and wherein the base embedding space is lifted for at least the backbone and the classifier head.

7. A computer program product for incremental learning without forgetting for a classification/detection model, the computer program product comprising one or more computer readable storage mediums having program code embodied therewith, the program code comprising programming instructions for:

receiving, at a computing system, a classification/detection model comprising a base embedding space and corresponding base embedding vectors that are based on a base training dataset comprising base classes;

adding a new training dataset including new classes to the classification/detection model to expand the classification/detection model;

adding a new dimension to the base embedding space in response to adding the new training dataset including the new classes to the classification/detection model thereby producing an expansion of the base embedding space forming an expanded embedding space in which the new classes exist within an orthogonal subspace which is above and below the base embedding space;

training the classification/detection model for the expanded embedding space which includes the base classes and the new classes thereby enabling the classification/detection model to recognize classes from previous sessions thereby eliminating a catastrophic forgetting problem, wherein the classification/detection model comprises a backbone, a region proposal network, and a classifier head, wherein the region proposal network and the classifier head utilize expanded embedding vectors including additional dimensions that account for both the base embedding space and the orthogonal subspace thereby increasing a dimension of an embedding vector for layers of the classification/detection model; and freezing all layers of the classifier/detection model during generation of an expansion of the classifier/detection model, wherein the classifier head uses all dimensions for an expanded embedding vector within the expanded embedding space to compare a query embedding vector to a new class representative for the new classes.

8. The computer program product of claim 7, wherein the program code further comprises the programming instructions for:

zeroing out values of the expanded embedding space for the base classes for the new dimension; and freezing values of the expanded embedding space for the base classes for original dimensions.

9. The computer program product of claim 7, wherein the base training dataset and the new training dataset comprise image data, and wherein the base classes and the new classes correspond to target objects within the image data.

10. The computer program product of claim 9, wherein the program code further comprises the programming instructions for:

given an input image, detecting target objects from the base classes and the new classes using the classification/detection model comprising the expanded embedding space.

11. The computer program product of claim 10, wherein the program code further comprises the programming instructions for:

using the base embedding space comprising the base embedding vectors to detect target objects from the base classes; and using the expanded embedding space comprising expanded embedding vectors that are of the higher dimension to detect target objects from the new classes.

12. The computer program product of claim 7, wherein the classification/detection model is a representative-based detection model, and wherein the base embedding space is lifted for at least the backbone and the classifier head.

13. A system, comprising:

a memory for storing a computer program for incremental learning without forgetting for a classification/detection model; and a processor connected to said memory, wherein said processor is configured to execute program instructions of the computer program comprising:
  receiving, at a computing system, a classification/detection model comprising a base embedding space and corresponding base embedding vectors that are based on a base training dataset comprising base classes;
  adding a new training dataset including new classes to the classification/detection model to expand the classification/detection model;
  adding a new dimension to the base embedding space in response to adding the new training dataset including the new classes to the classification/detection model thereby producing an expansion of the base embedding space forming an expanded embedding space in which the new classes exist within an orthogonal subspace which is above and below the base embedding space;
  training the classification/detection model for the expanded embedding space which includes the base classes and the new classes thereby enabling the classification/detection model to recognize classes from previous sessions thereby eliminating a catastrophic forgetting problem, wherein the classification/detection model comprises a backbone, a region proposal network, and a classifier head, wherein the region proposal network and the classifier head utilize expanded embedding vectors including additional dimensions that account for both the base embedding space and the orthogonal subspace thereby increasing a dimension of an embedding vector for layers of the classification/detection model; and
  freezing all layers of the classifier/detection model during generation of an expansion of the classifier/detection model, wherein the classifier head uses all dimensions for an expanded embedding vector within the expanded embedding space to compare a query embedding vector to a new class representative for the new classes.

14. The system of claim 13, wherein the program instructions of the computer program further comprise:
  zeroing out values of the expanded embedding space for the base classes for the new dimension; and
  freezing values of the expanded embedding space for the base classes for original dimensions.

15. The system of claim 13, wherein the base training dataset and the new training dataset comprise image data, and wherein the base classes and the new classes correspond to target objects within the image data.

* * * * *